United States Patent [19]

Wakeford

[11] 4,189,422
[45] Feb. 19, 1980

[54] POLYESTER COMPOSITION

[75] Inventor: David E. Wakeford, Welwyn, England

[73] Assignee: Imperial Chemical Industries Limited, London, England

[21] Appl. No.: 595,752

[22] Filed: Jul. 14, 1975

[30] Foreign Application Priority Data

Jul. 31, 1974 [GB] United Kingdom ............... 33698/74

[51] Int. Cl.$^2$ ............................................... C08K 3/22
[52] U.S. Cl. ........................... 260/40 R; 260/45.7 R; 260/DIG. 24; 260/DIG. 35
[58] Field of Search .... 260/40 R, DIG. 24, DIG. 35, 260/45.7 R

[56] References Cited

U.S. PATENT DOCUMENTS

| | | | |
|---|---|---|---|
| 2,568,331 | 9/1951 | Friletti | 260/40 R |
| 2,661,344 | 12/1953 | Slocombe et al. | 260/45.7 R |
| 2,893,906 | 7/1959 | Taylor | 260/45.7 R X |
| 2,906,726 | 9/1959 | Fitzgerald et al. | 260/45.7 R |
| 3,012,003 | 12/1961 | Speyer | 260/45.7 R |
| 3,368,995 | 2/1968 | Furukawa et al. | 260/40 R |
| 3,516,957 | 6/1970 | Gray et al. | 260/40 R X |
| 3,567,693 | 3/1971 | Pürma | 260/75 R |
| 3,583,935 | 6/1971 | Weissermel et al. | 260/40 R |
| 3,671,487 | 6/1972 | Abolins | 260/40 R |
| 3,847,861 | 11/1974 | Largman et al. | 260/40 R |
| 3,855,277 | 12/1974 | Fox | 260/40 R X |

OTHER PUBLICATIONS

Szmercsányi et al., "Interaction Between Unsaturated Polyester Resins and Fillers," Kunststoffe, vol. 58, pp. 907-912 (Dec. 1968).
Szmercsányi, "Zur Wechselwirkung zuischen ungesättigten Polyesterharzen und Metalloxiden," Kunstoffe, vol. 60, p. 1066 (1970).
Fekete, "A Review of the Status of Thickening Systems for SMC, LS-SMC, BMC, and LS-BMC Compounds," S.P.I. Annual Conf. Sect. 12-D, pp. 1-24. (1972).
Szmercsányi et al., Journal of Polymer Science, vol. 12, pp. 2155-2163 (1974).

Primary Examiner—Donald E. Czaja
Assistant Examiner—S. M. Person
Attorney, Agent, or Firm—Cushman, Darby & Cushman

[57] ABSTRACT

Thermoplastic polyester composition containing 2-70% by weight of inorganic fillers and calcium oxide or strontium oxide for improving the melt viscosity stability of the polyester composition under melt conditions.

9 Claims, No Drawings

POLYESTER COMPOSITION

This invention relates to thermoplastic polyester compositions and more particularly to the stabilisation of the viscosity of thermoplastic polyester composition containing inorganic fillers under melt conditions.

A problem which exists in the production and subsequent fabrication of thermoplastic polyester compositions is that such compositions are prone to degradation when the polyesters are heated to a molten condition in the presence of moisture. This problem which is shown up as a reduction in melt viscosity is accentuated when compositions containing various inorganic fillers are prepared because these may contain appreciable amounts of absorbed water. Although the problem can be overcome to some extent by thoroughly drying all ingredients prior to compounding under melt conditions thus is an unsatisfactory solution because not only does it increase the cost of the product but does not prevent the problem arising again when the fabricator moulds articles under melt conditions because water may be absorbed by the granules of the composition after the compounding stage and during storage. Polyester compositions have now been developed which are less susceptible to this problem and are more resistant to degradation under molten conditions than those previously known.

Accordingly there is provided a polyester composition comprising a mixture of a thermoplastic polyester, from 2 to 70% by weight of the composition of an inorganic filler and at least one oxide of calcium or strontium, wherein the concentration of oxide, by weight of the composition, is at least about 0.05%, preferably at least 0.1% and not greater than about 3%, preferably not greater than about 2%.

As a further aspect of the invention there is provided a process for stabilising the melt viscosity of a polyester composition containing from 2 to 70% by weight of inorganic filler comprising adding at least one oxide of calcium or strontium to the composition at a concentration based on the total weight of the composition of between at least about 0.05%, preferably at least 0.1% and not more than about 3%, preferably not more than 2% and subjecting the composition to conditions which melt the polyester and intimately disperse the oxide.

The oxides should be in a form that can be readily dispersed in the polyester and are preferably in a form that will break down to give a finely divided particulate material when compounded with the polyester. It is desirably in the form of a pellet coated with a material providing a barrier to exclude moisture such as wax. The barrier material may also act as a lubricant to assist processing and release of the finished article from a mould.

In general, the oxides cannot be sufficiently well dispersed so that all the moisture present is taken up by the stoichometric equivalent of the oxides and it is necessary to add an excess of the oxides to ensure that as much as possible of the moisture is taken up. It is also necessary to allow for any moisture that may be taken up by granules of the composition from the atmosphere after they have been compounded and before they are converted into shaped articles. Too great an excess of the oxide should be avoided because the physical properties of mouldings formed from the polyester may be adversely affected. Optimum results in terms of improving the melt stability whilst retaining an adequate level of physical properties are obtained using not more than about 3% of the oxide. For a typical polyester composition containing about 30% of glass fibres and 0.1% moisture, 2% or less of the oxides normally provide a useful stabilising effect. As a general rule the minimum quantity of the oxides providing a useful effect may be taken as that quantity which brings about a 20% reduction in the Degradation Value as determined by the standardised test as hereinafter described when compared with control compositions not containing the oxides.

The minimum concentration of the oxides required to resist a fall in melt viscosity for a given polyester composition will depend on a variety of factors such as the amount of moisture present in the polyester and the inorganic fillers, the degree of dispersion of the oxides in the compositions and the storage conditions to which the compositions are subjected prior to fabrication. The required minimum 20% reduction in the Degradation Value may be achieved using as little as about 0.05% of the oxides, although in general calcium oxide is effective at lower concentrations than strontium oxide.

It will be appreciated that when the polyester contains some moisture part of the oxides will be converted to the hydroxide form so that the compositions will normally contain some hydroxide in addition to oxide. The above defined compositions refer to the presence of oxides as such and do not include any hydroxide which may be formed.

The thermoplastic polyesters of the compositions which may be stabilised by the use of calcium or strontium oxides include any of the melt processable polyesters or copolyesters particularly those based on aromatic dicarboxylic acids or their derivatives, such as terephthalic acid, isophthalic acid or 1,2-bis(4-carboxyphenoxy)ethane, and glycols such as aliphatic glycols of the formula $HO-(CH_2)_n-OH$, where n may be from 2 to 10, cyclic aliphatic glycols such as cyclohexane diol and linear polyols having up to about 50 carbon atoms, particularly polytetramethylene ether glycol. In addition, the acid or glycol components of the polyester or copolyester may be halogenated in order to introduce a measure of fire retardancy into the polyester. Preferred halogenated components are ethoxylated tetrabromo bisphenol A and dibromodimethyl terephthalate.

The polyesters or copolyesters may also contain a minor amount of components having a functionality of at least 3, such as tri- or tetra-carboxylic acids and polyols having at least 3 hydroxyl groups, such as pentaerythritol. When present, these may be included in an amount sufficient to give rise to a branched polymer but insufficient to give rise to cross-linked polymers which are not readily processable under melt conditions.

Preferred polyesters are those containing at least 80% by weight of repeating units selected from ethylene terephthalate, tetramethylene terephthalate or ethylene-1:2-diphenoxy-ethane-4,4'-dicarboxylate units, although the invention is also effective in reducing the drop in melt viscosity of the segmented polyether esters such as those containing segments of tetramethylene terephthalate and polytetramethylene ether glycol terephthalate in which the weight concentration of tetramethylene terephthalate units may be as low 30%.

Although it has previously been proposed to include metal oxides, such as magnesium oxide, in polyesters for the purpose of nucleation of glass-filled polyesters most metal oxides accelerate the degradation of polyesters under melt conditions even though they may be effective as desiccants. It is also well known that water is eliminated in the condensation reactions when polymers such as polyesters and polyamides are heated under melt conditions and it might be predicted that the removal of this water would reduce the extent of hydrolytic degradation. Surprisingly, however, the use of calcium oxide in polyamides results in acceleration of the fall in viscosity of the composition under melt conditions. Whilst the mechanism for the effects obtained from the present invention are not fully understood it is apparent that they do not arise simply from the removal of water from the system.

The extent to which calcium oxide improves the melt stability of the polyester is assessed by measuring the change in melt flow index (MFI) of a composition after it has been subjected to a standard heat treatment in a melt viscometer and comparing it with the change in melt flow index of the compound not containing one of the specified oxides. The results quoted in this specification were obtained using the method of ASTM 1238-74 (Procedure A) using a total load of 2.16 kg and a die diameter of 2.095 mm at 240° C. The weight of compound extruded after periods of 5 to 15 minutes in the extruder are measured over 15-second intervals in the periods between 5 and 6 minutes and 15 and 16 minutes. The results obtained for the 15-second intervals are averaged, the average figures being quoted as $MFI_5$ and $MFI_{15}$ respectively.

The extent to which the melt viscosity of the compound falls in the presence of the oxides is calculated as a "Degradation Value":

$$(\text{Degradation Value}) \frac{MFI_{15} \text{ (compound + oxide)} - MFI_5 \text{ (compound)}}{MFI_5 \text{ (compound)}} \times 100\%$$

This may be compared with the fall in melt viscosity of the standard compound calculated as $[MFI_{15}(\text{compound}) - MFI_5(\text{compound})]/MFI_5(\text{compound}) \times 100\%$ At appropriate levels of the oxides the fall in melt viscosity of the polyester composition under melt conditions is not only greatly reduced but may even be shown up as a reduced melt flow index figure in comparison with the melt flow index of the standard compound. Such reductions as indicated by the MFI test are recorded as negative degradation values.

Some indication of the changes taking place in the physical characteristics of the composition after subjecting it to melt conditions can be obtained by measuring the solution viscosity of the polyester using a 1% solution of the polyester of the composition in o-chlorophenol at 25° C. The values obtained, expressed in the form of relative viscosity (RV) show increases when the oxides of the invention have been present during melt compounding of the polyesters by comparison with polyesters not containing the specified oxides.

The oxides are most conveniently added to the polyester in a mixing process in which the oxides are intimately dispersed in the polyester. Although this may be achieved by addition of the oxides to the polyester at the end of the polymerisation cycle, for optimum effect if is preferred that they are blended in a screw extruder together with the inorganic fillers and any other additives that may be desired for modifying the properties of the polyester.

The inorganic fillers may be any filler which improves at least one of the physical properties of thermoplastic polyester compositions. These may be included at concentrations of from 2 to 70%, preferably 10% to 50% by weight of the composition. Of the inorganic fillers, the reinforcing fillers, notably glass fibre, are the most important. Many of the commercially available glass fibres that are suitable for reinforcing polyesters cause significant reduction in the melt viscosity of polyesters under melt conditions. The use of calcium or strontium oxides according to the present invention is effective in reducing this fall in melt viscosity. It will be appreciated by those skilled in the art that a wide variety of glass fibres treated with various surface sizes containing coupling or anchoring agents are commercially available. For optimum reinforcement of polyesters the glass fibre should be chosen having an appropriate sizing system. Suitable glass fibres may be chosen by experimental measurement of reinforcement or by consulting the glass fibre manufacturer.

In addition to improving reinforcement the fillers may be chosen to improve other physical properties of the polyester composition. For example these include mica, for improving the flexural modulus and resistance to warping, wollastonite and various finely divided clays for improving the electrical properties, talc for improving heat distortion properties and graphite for conferring a low coefficient of friction on the composition.

The compositions may also contain a variety of other auxiliary chemicals such as pigments, lubricants, heat and light stabilisers and flame retardants.

The use of flame retardants to confer flame retardancy on otherwise flammable polyesters is particularly important because it is an essential requirement of many end-uses of polyester compositions. A wide variety of flame retardants are available for use in this application particularly materials containing an appreciable proportion of phosphorus or halogens. The preferred flame retardants are halogenated organic compounds, particularly brominated compounds. For polyesters compounds of formula,

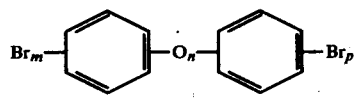

where n may be 0 or 1, each of m or p may be from 1 to 5, are particularly effective flame retardants. The effectiveness of halogenated flame retardants is known to be enhanced by the presence of compounds of the Group GpVb metals, arsenic, antimony and bismuth. Of these antimony oxide is widely used and may be included at a concentration to give a weight ratio of halogen to antimony of between 0.5:1 and 4:1 preferably between 0.5:1 and 2:1.

The flame retardancy of compositions may be conveniently assessed using the Underwriters Laboratories Test UL94. Using the Vertical Burning Test of UL94 compositions should have a flame retardancy rating of at least 94VI and preferably 94VO when tested on samples having a thickness of 1.5 mm or less. The concentrations of flame retardants necessary to give these ratings are normally in the range 3 to 25% preferably 5 to 15% by weight of the composition.

A particularly useful aspect of the invention is the use of the specified oxides to produce filled compositions which do not exhibit dripping when tested as thin section samples according to the standard tests such as Underwriters Laboratories Test UL94. For example, a glass-filled polyester composition which is rated as 94VO when tested using a sample of 1.5 mm thickness according to UL94 may nevertheless be unsatisfactory for some practical uses because it drips during the burning test. The inclusion of the oxides according to the invention can render such compositions non-dripping when tested on samples of 1.5 mm thickness or less. The polyester of the composition may be a normally flammable polyester which requires the admixture of fire retardant materials to reduce its flammability or may be a polyester which includes copolymerised halogenated materials making the polyester non-burning as assessed by a standard test such as the UL94 test.

The compositions of the invention are suitable for the fabrication of a wide variety of articles particularly in articles which make use of the excellent electrical properties of polyesters. It is particularly useful for fabrication procedures which require a high melt viscosity such as in extrusion or blow moulding or the preparation of film by the known blown film technique.

The invention is illustrated by the following Examples in which Examples 1 and 6 for comparison purposes.

EXAMPLE 1

Poly(tetramethylene terephthalate) having a relative viscosity of 2.22 (as measured on a 1% solution of the polymer in o-chlorophenol at 25° C.) was compounded with 30% by weight of commercially available glass fibre in a vented screw extruder at an indicated barrel temperature of 260° C. The composition was extruded as a lace under water. After chopping the lace into granules the product was dried to a moisture content of about 0.1%. The $MFI_5$ value of the composition determined by the method described was found to be 4.6 falling to 19.1 after 15 minutes indicating a degradation value of 315%. The tensile strength was measured according to ASTM D638-72 except in that a pulling speed of 2.54 cm/min was used and the samples tested were "as-moulded" specimens which had not been subjected to any particular conditioning cycle. A value of 127 $MN/m^2$ was obtained. Impact strength was assessed by the Notched Charpy method (ASTM D256-73) using a notch radius of 0.25 mm. A value of 8.0 $KJ/m^2$ was obtained. The relative viscosity of the polyester in the composition was measured on a sample of polyester extracted from the composition after it had been subjected to the melt flow index testing cycle (16 min). The relative viscosity was found to have fallen to 1.90.

EXAMPLE 2

The procedure of Example 1 was repeated (using the same sample of polyester) except in that 1.0% of "Analar" grade calcium oxide was also compounded in the screw extruder. Degradation values and physical properties of the composition are given below:

| $MFI_5$ | $MFI_{15}$ | Degradation Value (%) | Tensile Strength (MN/m²) | Notched Charpy Impact Strength KJ/m² |
|---|---|---|---|---|
| 2.1 | 5.4 | 17 | 117 | 7.4 |

The relative viscosity of the polyester of the composition measured after the composition had been subjected to the melt flow index cycle (16 min) was 2.18.

By comparison with Example 1 it is seen that the calcium oxide-containing composition is much more stable to degradation than that of Example 1.

EXAMPLE 3

The procedure of Example 1 was repeated except in that in addition to the glass fibre the composition contained 5% of antimony trioxide and 8% of decabromodiphenylether by weight based on the total composition and compounding was carried out using an indicated barrel temperature of 240° C. Samples of this composition were prepared containing 0, 0.5 and 1.0% of calcium oxide by weight of the total composition. Results obtained in the MFI test and of physical properties of test pieces moulded from the compositions are listed below.

| CaO concentration (%) | $MFI_5$ | $MFI_{15}$ | Degradation Value (%) | Tensile Strength MN/m² | Impact Strength MN/m² |
|---|---|---|---|---|---|
| 0 | 4.3 | 9.6 | 123 | 123 | 7.4 |
| 0.5% | 3.0 | 5.0 | 16 | 126 | — |
| 1.0% | 1.4 | 1.8 | −58 | 118 | 6.5 |

The fire retardancy properties of the composition were tested according to Underwriters Laboratories Specification UL94. On samples having a thickness of 3 mm all samples were found to have a rating of 94V-O and did not exhibit dripping. On a sample thickness of 1.5 mm the sample containing no calcium oxide had a rating of 94V-O but dripped. The samples containing 0.5 and 1.0% calcium oxide had a rating of 94V-O and did not drip even at a thickness of 0.75 mm.

The procedure was repeated using lower levels of calcium oxide. At a concentration of 0.3% calcium oxide compositions were found to have a 94V-O rating when tested on samples of 0.75 mm thickness and was non-dripping. The degradation value of this composition was found to be 12%.

EXAMPLE 4

The stability of compositions according to the invention containing 30% of glass fibre prepared according to Example 1 was further illustrated by maintaining selected compositions at processing temperatures of 240° C. and 260° C. for protracted periods to simulate the severe conditions that might be encountered during fabrication of the compositions. The table below shows the results obtained together with some of the changes in physical properties.

(a) Holding temperature 240° C.

| Time (minutes) | CaO concentration (%) | $MFI_t$* | Degradation Value (%) | Tensile Strength (MN/m²) |
|---|---|---|---|---|
| 5 | 0 | 4.4 | — | 129 |
| 15 | 0 | 15.3 | 248 | 125 |
| 30 | 0 | 30.3 | 588 | 115 |
| 5 | 1.0 | 0.9 | −80 | 130 |
| 15 | 1.0 | 1.8 | −60 | 132 |
| 30 | 1.0 | 2.0 | −54 | 135 |

*$MFI_t$ is the MFI measured according to the standard test following heat treatment for time t given in column 1 of the table.

(b) Holding Temperature 260° C.

| Time (minutes) | Oxide (%) | MFI,* | Degradation Value (%) |
|---|---|---|---|
| 5 | 0 | 13.6 | — |
| 15 | 0 | 63.3 | 365 |
| 30 | 0 | 101.8 | 648 |
| 5 | 1.0 CaO | 3.1 | −77 |
| 15 | 1.0 CaO | 6.7 | −51 |
| 30 | 1.0 CaO | 12.6 | −7 |

*Measurements made at 260° C. rather than 240° C.

EXAMPLE 5

The procedure of Example 2 was repeated except in that the calcium oxide used was a free-flowing pellet grade coated with mineral oil and wax obtained from John and E Sturge Ltd under the trade name "Caloxol" W5G containing 83% of calcium oxide. The composition gave a degradation value as measured under the conditions previously specified of -54%. A test sample mould from the composition had a tensile strength of .128 MN/m². Both these values compare favourably with the control values of Example 1 and the "Analar" grade calcium oxide used in Example 2.

EXAMPLE 6

The use of other metal oxides which might be expected to show similar effects to the specified oxides of the invention were evaluated in the compositions of Example 3 replacing the calcium oxide by each of the oxides listed below. The degradation obtained in each case was greater than that of the standard.

| Oxide | MFI$_5$ | MFI$_{15}$ | Degradation Value (%) |
|---|---|---|---|
| 0 | 4.3 | 9.6 | 123 |
| 1% MgO | 22.7 | 57.2 | 1230 |
| 2% ZnO | 31.3 | 81.4 | 1800 |

In a further comparison experiment the procedure of Example 2 was repeated except in that the calcium oxide was replaced by an equivalent weight of anhydrous aluminium oxide. By comparison with the Degradation Value of 315% obtained in Example 1 a figure of 320% was obtained using the standard test indicating that anhydrous $Al_2O_3$ does not act as a stabiliser under melt conditions.

EXAMPLE 7

Poly(ethylene terephthalate) having a relative viscosity of 1.78 and a moisture content after drying of 0.005% was compounded at 280° C. in a vented screw extruder with 30% by weight of glass fibres and 0.5% and 1.0% by weight respectively of calcium oxide. The compositions obtained were subjected to the degradation test previously specified and the results obtained are recorded below.

| Calcium Oxide (%) | MFI$_5$* | MFI$_{15}$* | Degradation Value |
|---|---|---|---|
| 0 | 3.08 | 4.31 | 40 |
| 0.5 | 3.4 | 3.78 | 23 |
| 1.0 | 2.2 | 2.4 | −22 |

*MFI measurements carried out at 270° C.

EXAMPLE 8

The procedure of Example 2 was repeated except in that the calcium oxide was replaced with strontium oxide at concentrations of 0.5 and 1.0% by weight of the composition. The degradation values listed below indicate that strontium oxide reduces the fall in melt viscosity of the composition containing no strontium oxide although the improvement is less significant than for equivalent concentrations of calcium oxide.

| SrO concentration | MFI$_5$ | MFI$_{15}$ | Degradation Value (%) | Tensile Strength (MN/m²) | Impact Strength (IS¼) (KJ/m²) |
|---|---|---|---|---|---|
| 0 | 5.8 | 20.3 | 250 | 136 | 8.6 |
| 0.5 | 3.7 | 12.3 | 112 | 130 | 9.4 |
| 1.0 | 4.6 | 12.6 | 117 | 132 | 9.6 |

EXAMPLE 9

Compositions containing 30% by weight of various inorganic fillers were compounded according to the procedure of Example 1 but at a compounding temperature of about 240° C. with 0.5% and 1.0% of calcium oxide respectively. The degradation values recorded in the table below show that calcium oxide reduces the MFI values in the presence of each filler compared with control runs not containing the oxide.

| Inorganic filler | CaO concentration (%) | MFI$_5$ | MFI$_{15}$ | Degradation Value (%) |
|---|---|---|---|---|
| Talc | 0 | 10.0 | 19.7 | 97 |
|  | 0.5 | 9.0 | 13 | 30 |
|  | 1.0 | 7.2 | 9.4 | −6 |
| Wollastonite | 0 | 13.4 | 21.8 | 63 |
|  | 0.5 | 11.3 | 13.9 | 4 |
|  | 1.0 | 10.1 | 9.6 | −28 |
| Mica | 0 | 9.7 | 20.4 | 110 |
|  | 0.5 | 6.9 | 9.7 | 0 |
|  | 1.0 | 6.1 | 7.1 | −27 |

EXAMPLE 10

The procedure of Example 3 was repeated except in that 1% by weight of a carbon black (S 160 fluffy carbon black obtained from Degussa) was included in the composition. This composition was prepared both in the absence of calcium oxide and in the presence of 0.1% calcium oxide. The composition not containing calcium oxide had an MFI$_5$ value of 5.5, a rating of 94V-O or the UL94 test using a sample of 1.5 mm thickness but exhibited dripping in this test. The addition of 0.1% calcium oxide to the composition gave an MFI$_5$ value of 3.6, a rating of 94V-O and dripping was absent on samples 1.5 mm in thickness.

EXAMPLE 11

The effect of calcium oxide on the stability of a segmented polyether ester composition when subjected to the standardised degradation test was examined. The polymer used was the elastomer "Hytrel" 4055, a polymer containing units of tetramethylene terephthalate and polytetramethylene ether glycol terephthalate. This polymer was compounded at 240° C. with 30% by weight of the composition of glass fibre and calcium oxide. The table below shows the effects obtained.

| CaO concentration (%) | MFI$_5$ | MFI$_{15}$ | Degradation Value |
|---|---|---|---|
| 0 | 4.4 | 16.0 | 264 |
| 0.5 | 1.7 | 3.6 | −19 |
| 1.0 | 0.67 | 7.3 | −83 |

I claim:

1. A polyester composition comprising a mixture of a thermoplastic polyester, from 2 to 70% by weight of the composition of an inorganic filler and at least one oxide of calcium or strontium, wherein the concentration of oxide by weight of the composition is at least about 0.05% and not greater than about 3%, and is sufficient to improve the stability of the composition under melt conditions by at least 20%, the improvement being determined by comparing a Degradation Value for said compositions with a Degradation Value for identical compositions not containing said oxides, the Degradation Value being determined by measuring the percentage change in melt flow index obtained after maintaining said compositions under melt conditions for 15 minutes relative to the melt flow index of identical compositions not containing said oxides maintained under identical melt conditions for 5 minutes, the measurements being made according to the procedure of ASTM method 1238-74 (Procedure A) using a total load of 2.16 kg and a die diameter of 2.095 mm.

2. A polyester composition according to claim 1 wherein the concentration of oxide is at least about 0.1% and not greater than about 2% by weight of the composition.

3. A polyester composition according to claim 1 containing from 10 to 50% by weight of inorganic filler.

4. A polyester composition according to claim 1 in which the inorganic filler is selected from the group comprising glass fibre, mica, wollastonite, finely divided clays, talc and graphite.

5. A polyester composition comprising 2% to 70% by weight of the composition of an inorganic filler, at least sufficient copolymerised or admixed fire retardant materials to give the composition a flame retardancy rating of 94VO and at least sufficient calcium and/or strontium oxides to prevent the composition dripping and to improve the stability of the composition by at least 20%, the flame retardancy and dripping being measured by the Vertical Burning Test of Underwriters Laboratories Test UL94 using test samples 1.5 mm or less in thickness and the improvement in melt stability being determined by comparing a Degradation Value for said compositions with a Degradation Value for identical compositions not containing said oxides, the Degradation Value being determined by measuring the percentage change in melt flow index obtained after maintaining said compositions under melt conditions for 15 minutes relative to the melt flow index of identical compositions not containing said oxides maintained under identical melt conditions for 5 minutes, the measurements being made according to the procedure of ASTM method 1238-74 (Procedure A) using a total load of 2.16 kg and a die diameter of 2.095 mm.

6. A polyester composition according to claim 5 in which the inorganic filler is glass.

7. A process for stabilising the melt viscosity of a thermoplastic polyester composition containing from 2 to 70% by weight of inorganic filler comprising adding at least one oxide of calcium or strontium to the composition at a concentration based on the total weight of the final composition of between at least about 0.05% and not more than about 3%, and subjecting the composition to conditions which melt the polyester and intimately disperse the oxide whereby the stability of the composition under melt conditions is improved by at least 20%, the improvement being determined by comparing a Degradation Value for said compositions with a Degradation Value for identical compositions not containing said oxides, the Degradation Value being determined by measuring the percentage change in melt flow index obtained after maintaining said compositions under melt conditions for 15 minutes relative to the melt flow index of identical compositions not containing said oxides maintained under identical melt conditions for 5 minutes, the measurements being made according to the procedure of ASTM method 1238-74 (Procedure A) using a total load of 2.16 kg and a die diameter of 2.095 mm.

8. A process according to claim 7 in which the concentration of oxide is between about 0.1% and not more than about 2% by weight of the composition.

9. A process according to claim 7 in which the oxide used has a coating of a moisture-excluding barrier material.

* * * * *